June 25, 1940.                J. L. FINCH                2,205,880
MODULATION SYSTEM Original Filed Feb. 27, 1933

INVENTOR
JAMES L. FINCH
BY
ATTORNEY

Patented June 25, 1940

2,205,880

UNITED STATES PATENT OFFICE 2,205,880

MODULATION SYSTEM

James L. Finch, Patchogue, N. Y., assignor to Radio Corporation of America, a corporation of Delaware Application January 15, 1936, Serial No. 59,214, which is a division of application Serial No. 658,735, February 27, 1933, now Patent No. 2,031,639, dated February 25, 1936. Divided and this application August 6, 1937, Serial No. 157,657

14 Claims. (Cl. 179—171.5)

This application is a division of my United States application #59,214 filed January 15, 1936, Patent No. 2,165,844, July 11, 1939, the latter application being a division of my United States application Serial No. 658,735, filed February 27, 1933, Patent No. 2,031,639 dated February 25, 1936, and concerns a system of modulation that may be applied to a wide variety of uses, such as for the control of a system of power generation or transference in respect to its intensity, phase, frequency, or other properties. The invention is particularly applicable to modulation of high frequency oscillations in any of their characteristics at signal frequency. It may also be applied to the control of light or heat or fluid streams or of magnetic fields, or to the speed of moving elements or vehicles.

The principle upon which the present invention operates is that of providing a detecting device in the system after the point of change or modulation, which detecting device is responsive to the change or modulation desired. The detecting device is equipped with a control element and is so arranged that its output reacts back to a point earlier in the system so as to produce a degenerative effect. The control element in the detector permits the degenerative effect to go to a definite point which is determined by the control element, but no further than said point. The definite point is adjustable. Thus the system is changed or modulated in accordance with the control element in the detector.

In the prior art it has been the practice to produce modulation by means of some control element and to design the system to given linear response to this control element and to suppress any other factors which tend to produce extraneous modulation. Due to the difficulties encountered the resulting modulation is frequently distorted and different from that desired. My invention makes unnecessary these precautions, which are normally expensive and difficult to accomplish.

Figure 1:
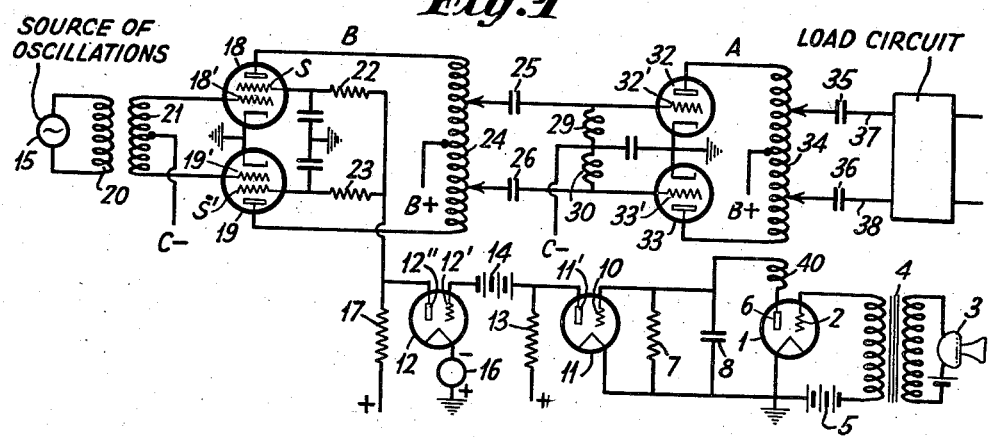

The novel features of my invention have been pointed out with particularity in the claims appended hereto. The nature of my invention and the operation thereof will be best understood from the detailed description thereof, which follows, and therefrom when read in connection with the attached drawing, in which:

Figure 1 shows a radio transmitter including my novel oscillation relaying device and my novel control means which determine the character of the oscillations being relayed. In this arrangement, energy is derived from the output of a high frequency amplifier connected to a modulator, impressed on a modulation frequency amplifier, and acts therein to control the character of the modulating potentials applied by way of coupling tubes from the modulation frequency amplifier to an electrode in the modulator stage to control the same.

Figure 2:
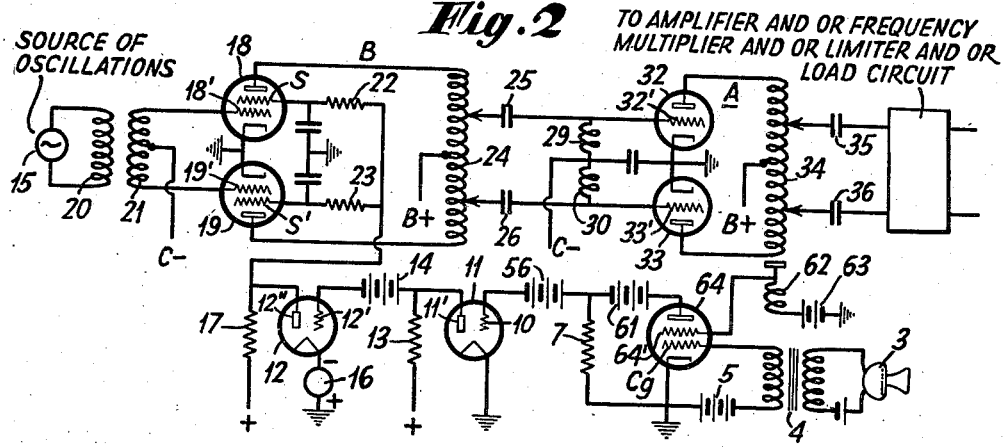
Figure 3:
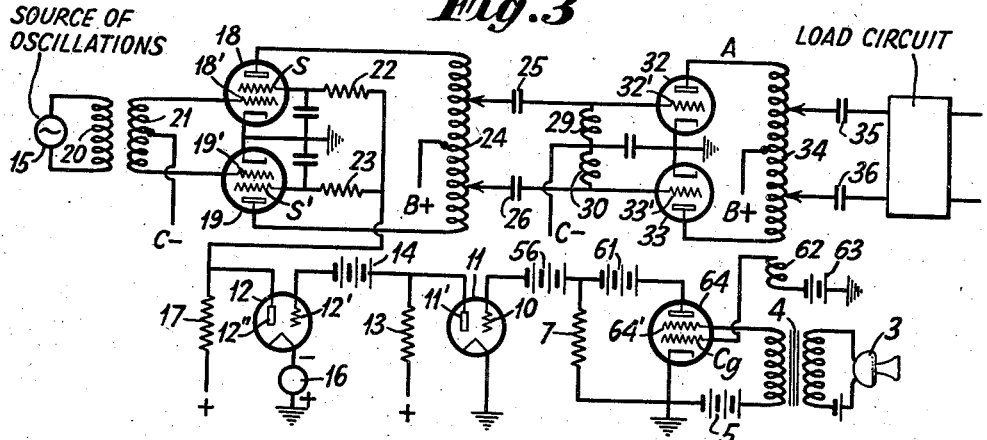

Figures 2 and 3 inclusive show modifications of the arrangement of Figure 1. In the modifications of Figures 2 and 3, the controlled modulation frequency amplifier is of the screen grid type and the screen grid and control grids are respectively capacitively and inductively coupled to the output of the amplifier stage. The remaining grid-like electrodes in each of the controlled modulation frequency amplifier tubes are connected to the source of modulated potentials.

I will describe specific embodiments of my invention as applied to the amplitude modulation of a radio transmitter. It will be understood, however, that the invention is readily applicable to other types of modulation.

Referring to Figure 1 of the drawing, A is the final stage of a transmitter. The final stage A is excited by stage B. The stage B comprises a pair of thermionic tubes 18 and 19 having the control grids 18' and 19' connected to the opposite terminals of a winding 21, the center point of which may be connected, as shown, to the pole of a biasing source, not shown, at —C. The inductance 21 may be coupled by way of circuit 20 to any source of high frequency oscillations 15. The oscillations impressed from 15 on 21 are repeated and amplified in the tubes 18 and 19 and appear in the inductance 24 connected between the anodes of tubes 18 and 19. The oscillations appearing in 24 are applied to the control grids 32' and 33' of tubes 32 and 33 by way of coupling and blocking condensers 25 and 26. Biasing potential for the grids 32' and 33' of tubes 32 and 33 is supplied from —C connected to a source, not shown, by way of choking coils 29 and 30 respectively. The high frequency oscillations impressed on the control grids of the power amplifier tubes in stage A are repeated and amplified in said tubes and appear in the inductance 34 connected between their anodes. The amplified oscillations may be supplied from the inductance 34 in any manner to a load circuit. For example, the energy may be fed to the load circuit through coupling condensers 35 and 36 in lines 37 and 38 tapped to inductance 34.

1 is a three element tube which serves as the detector variably coupled, by way of an inductance 40 connected to its anode 6, to the output of the final stage A and responsive to the amplitude of the output of said stage. The voltage on control grid 2 is made responsive to the voice currents in microphone 3 by means of transformer 4 and bias battery 5. When the voltage impressed on anode 6, due to the output of A, is high enough to overcome the effect of the blocking voltage on 2, anode current will flow in tube 1, the direct current component returning through resistor 7 and the alternating current component through smoothing capacitor 8. Inductance 40 also prevents the radio frequency anode potential, transferred to 6 from the final stage of A, from being short-circuited by 8. The control grid 10 of amplifier tube 11 has a potential impressed on it due to the resistance drop of the current flowing through 7. This amplifier tube 11 is resistance coupled to the control grid 12' of modulator tube 12 by means of resistor 13 and bias battery 14. The modulator tube 12 has its anode electrode 12'' connected to its cathode by way of resistance 17 and a source of direct current voltage not shown. The screen grid electrodes S and S' of tubes 18 and 19 are connected, as shown, to the resistance 17. A change of current intensity flowing in resistance 17 causes a change in the potential applied to the screen grids of tubes 18 and 19. As the current through 17 decreases, the potential on the screen grid electrodes 18' and 19' increases and vice versa. In this manner, the tube 12 modulates the screen grids of tubes 18 and 19 in the radio frequency amplifier stage B.

The proportions of these circuits are so chosen that when the peak radio frequency potential on 6 exceeds the cut-off voltage as determined by the voltage on 2 by an appreciable amount, the reaction back through the modulator tube 12 will reduce the amplitude of the oscillations supplied by stage B to stage A, and the power output of A until the peak radio frequency potential on 6 just barely exceeds the cut-off voltage. Thus, as the potential on grid 2 is varied in accordance with the voice, the cut-off voltage of 1 is varied in proportion and the peak radio frequency potential output is automatically adjusted to just exceed this voltage. Thus, the output voltage is modulated truly in accordance with the modulating potentials.

Now, if some extraneous modulation is introduced, such as a hum modulation on the output of radio frequency source 15, or if the gain of stage A or B is varied by reason of alternating current on the filaments, or due to inconstant plate or bias voltages, such modulation will be practically eliminated due to the degeneration introduced by the circuits of this invention. More specifically, such extraneous hum will cause an increase of the potential applied to 6. This increase in potential on 6 will act through amplifier 11 and modulator 12 to instantly reduce the potential on the screen grids S and S' of tubes 18 and 19 and reduce the amplitude of the oscillations supplied thereby to stage A.

It will be noted that the amplifier and modulator tubes 11 and 12, employed in this invention need not have a linear characteristic since any distortion introduced from this cause is of a secondary order.

The filament of the modulator 12 is shown at a negative potential with reference to the filaments of the modulated stage B. This is necessary in order to fully modulate the stage B through the screen grids.

The operation of this invention as applied to a radio transmitter using voice control and amplitude modulation is as follows:

Starting with no modulation, grid 2 will assume a potential at the middle of its operating range. Assume also that momentarily tube 12 is blocked, thus allowing stage B to pass a maximum amount of power on to stage A. Stage A will in turn put out a maximum power and coincidently will induce a maximum radio frequency voltage on 6. This causes a direct current potential to be impressed on 7 of a value much in excess of that required when acting through amplifier 11 and modulator 12 to decrease the output of B to zero, but when this output has dropped to a value low enough for the voltage on the output of A to have dropped to half value, the voltage on 6 will have dropped to a value just sufficient for the peaks to exceed cut-off and thus a stable condition at this voltage is maintained. Now, assume the voice causes 2 to drop to the most negative potential of its range. This will momentarily cut off tube 1, dropping the voltage on 7 to zero, which will in turn reduce the current in 17 and cause the screen grids of B to reach their maximum operating potential. This in turn will increase the gain of B and the output of A will rise to its maximum voltage value. The latter will be just sufficient to impress a high enough voltage on 6 to rectify a small amount of current and thus to maintain this value. Similarly, the output voltage will follow in inverse proportion any voltage impressed on 2 and thus will follow the voice currents.

It will be understood that the arrangement shown in Figure 1 may be modified in various manners without departing from the scope of the present invention.

The modulation frequency relay 1 may be a triode as shown in the preceding circuits, or may be of the screen grid type as shown in Fig. 2. When a tube of the screen grid type, such as tube 64, is used the anode is connected by way of a charging source 61 to the terminal of the resistance 7. The resistance 7 is connected to the control grid 10 of amplifier 11 through a second source 56. The inductance 34 is capacitively coupled to the screen grid electrode 64' of tube 64. Charging potential for the screen grid electrode 64' of tube 64 is supplied by way of a choke 62 and a source of potential 63, a terminal of which is grounded, as is the cathode of tube 64. When the radio frequency voltage induced on the screen grid 64' of 64 has attained the maximum positive value, it is assumed that the tube 64 will pass plate current then, and then only. This plate current reacts through the succeeding amplifiers 11, 12, etc., as explained before, to prevent the radio frequency voltage appearing in 34 from exceeding a critical value. This particular critical value changes with the control grid voltage on the control grid of tube 64. In this way, modulation of the oscillations relayed in the stages A and B which is truly characteristic of the signal is accomplished. This tube 64 may be utilized to replace the tube 1 in the prior modification.

In some cases, it may be desirable to use a tube of the screen grid type as a control tube and apply the modulating potentials to the screen grid and the control potentials to the control grid. In this case, a circuit as shown in Fig. 3 may be used. Here, as in the prior case, the anode of the tube 64 is supplied with positive potential by a source 61 and the terminal of resistance 7 is connected to the control grid 10 of tube 11 through a second source 56. Here, however, the control potentials are applied on the control grid $C_g$ of tube 64, which is maintained at a negative potential with respect to the cathode by a battery 63 connected to the choking inductance 62. It is noted that the battery here has its terminals reversed with respect to the battery 63 of Fig. 2. The modulation potentials are applied to the screen grid electrode 64' from the secondary winding of transformer 4. It is noted here that the battery 5, connected with the secondary winding of transformer 4, has its potential reversed with respect to the battery 5 in the preceding figures. This is in order that a positive potential may be supplied to the screen grid to enhance the amplification characteristics of this tube.

I claim:

1. In a signalling system, a thermionic amplifier tube having its input electrodes coupled to a source of high frequency oscillations, said amplifier tube having a screen grid electrode and having output electrodes coupled in an alternating current output circuit, a second amplifier tube having its input electrodes coupled to the alternating current circuit coupled to the output electrodes of said first named amplifier tube, a source of modulating potentials, a third amplifier tube having a plurality of electrodes, means coupling one of said third tube electrodes to said source of modulating potentials, means coupling another of said third tube electrodes to the screen grid electrode in said first named amplifier tube, and means coupling a third electrode of said third named amplifier tube to an electrode in said second named tube.

2. In a signalling system, a thermionic tube having its input electrodes coupled to a source of oscillations, an amplifier tube having its input electrodes coupled to the output electrodes of said first named tube, a source of modulating potentials, a control tube having its input electrodes coupled to said source of modulating potentials and its output electrodes coupled to the input electrodes of a second amplifier tube, said control tube having an auxiliary electrode, a resistance connected between the output electrodes of said second named amplifier tube, a third amplifier tube coupling a point on said resistance to an electrode in said first named tube, and an inductive coupling between the output electrodes of said first named amplifier and said auxiliary electrode in said control tube.

3. In a signalling system, a thermionic tube having input and output electrodes and having its input electrodes coupled to a source of high frequency oscillations, an amplifier tube having input electrodes coupled to the output electrodes of said first named tube, said amplifier tube having output electrodes, a source of modulating potentials, a control tube of the screen grid type having input electrodes coupled to said source of modulating potentials and having output electrodes coupled to an electrode in said first named tube, and a coupling between an output electrode in said amplifier tube and the screen grid electrode in said control tube.

4. A signalling system comprising, a thermionic tube having input electrodes coupled to a source of oscillations said tube having output electrodes, an amplifier tube having input electrodes coupled to the output electrodes of said first named tube said amplifier tube having output electrodes, a source of modulating potentials, a control tube of the screen grid type having its screen grid coupled to said source of modulating potentials and having output electrodes coupled to the electrodes in said first named tube, and a coupling between an output electrode of said amplifier tube and the control grid electrode in said control tube.

5. In a signalling system for linearly modulating high frequency modulations in accordance with signal potentials, a pair of thermionic tubes each having input and output electrodes and a screen-like electrode, an alternating current circuit connected between said input electrodes, said circuit being adapted to be energized by high frequency oscillations to be modulated, a second pair of thermionic tubes having input and output electrodes, symmetrical circuits connecting the input electrodes of said second named pair of tubes to the output electrodes of said first named pair of tubes, an alternating current circuit including an inductance connected between the output electrodes of said second named pair of tubes, a modulation frequency amplifier tube of the multi-grid type having an input circuit including one of said grids adapted to be energized by modulating frequency potentials, said modulation frequency amplifier tube having output electrodes connected in a circuit including a resistance, a coupling between another of said grids of said modulation frequency amplifier and said alternating current circuit connected between the output electrodes of said last named pair of tubes, a thermionic coupling tube having its input electrodes coupled to said resistance, a second thermionic coupling tube having its input electrodes coupled to the output electrodes of said first named coupling tube, and a circuit coupling the output electrodes of said second named coupling tube to the screen-like electrodes in said first named pair of tubes.

6. In a signalling system for linearly modulating high frequency modulations in accordance with signal potentials, a pair of thermionic modulator tubes each having a control electrode and an anode electrode, an alternating current circuit connected between said control electrodes, a pair of thermionic amplifier tubes each having input and output electrodes, symmetrical circuits connecting the input electrodes of said second named pair of tubes to the anode electrodes of said first named pair of tubes, an alternating current circuit including an inductance connected between the anode electrodes of said second named pair of tubes, a modulation frequency amplifier tube having input electrodes adapted to be energized by modulating frequency potentials, said modulation frequency amplifier tube having a screen-like electrode and having output electrodes connected in a circuit including resistance, a coupling between the screen-like electrode in said modulation frequency amplifier tube and the alternating current circuit connected between the anode electrodes of said second named pair of tubes, a thermionic coupling tube having its input electrodes coupled to said circuit including resistance, and a circuit coupling the output electrodes of said thermionic coupling tube to like electrodes in said first named pair of tubes.

7. In a system for linearly modulating high frequency oscillations in accordance with signal potentials, a thermionic modulator tube having input electrodes connected in an alternating current circuit, said tube also having output electrodes, a thermionic amplifier tube having input electrodes coupled to the output electrodes of said first named tube and output electrodes coupled to an alternating current circuit, a second thermionic amplifier tube having a control grid, a cathode, an anode and a screen-like electrode, a circuit coupled between the screen-like electrode and cathode of said second thermionic amplifier tube, said last named circuit being adapted to be energized by the signal potentials, a coupling between the control grid of said second named amplifier tube and the alternating current circuit coupled to the output electrodes of said first named amplifier tube, a resistance connected between the output electrodes of said second named amplifier tube, and a circuit coupling said resistance to an electrode in said modulator tube.

8. In a signalling system, a carrier wave amplifying tube having a control grid and a cathode energized by waves of carrier frequency, said tube also having an anode connected in an alternating current output circuit, means connected with an electrode of said tube and with said alternating current output circuit for lowering the gain of said tube when said output energy exceeds predetermined peak values, said means comprising an additional electron discharge tube having an output electrode coupled to an electrode in said tube and a pair of grid electrodes one of which is coupled to said alternating current output circuit, and means for controlling said peak values at signal frequency comprising a source of signalling potentials coupled with said other grid electrode of said additional tube.

9. In a signalling system a carrier wave amplifying tube having a control grid and a cathode energized by waves of carrier frequency, said tube also having an anode connected in an alternating current output circuit, means connected with an electrode at said tube and with said output alternating current circuit for lowering the gain of said tube when said output energy exceeds predetermined peak values, said means comprising an additional electron discharge tube having an output electrode coupled to an electrode in said tube, a control grid, and an auxiliary grid electrode, a circuit coupling said auxiliary electrode to said alternating current output circuit, and means for controlling said peak values at signal frequency comprising a source of signalling potentials coupled with said control grid electrode.

10. In a signalling system a carrier wave amplifying tube having a control grid and a cathode energized by waves of carrier frequency, said tube also having an anode connected in an alternating current output circuit, means connected with an electrode of said tube and with said output alternating current circuit for lowering the gain of said tube when said output energy exceeds predetermined peak values, said means comprising an additional electron discharge tube having an output electrode coupled to an electrode in said tube, a control grid, and an auxiliary grid electrode, means coupling said control grid to said alternating current output circuit, and means for controlling said peak values at signal frequency comprising a source of signalling potentials coupled with said auxiliary grid electrode.

11. In a signalling system, a carrier wave amplifying tube having a screen grid, a cathode, a control grid, and an output electrode, means for impressing carrier waves to be amplified on said control grid and cathode, an additional tube having input electrodes coupled to the output electrodes of said first named tube and having an anode connected in an alternating current output circuit, means connected with the screen grid electrode of said first named tube and with said alternating current output circuit for lowering the gain of said first tube when wave energy in said output circuit exceeds predetermined peak values, said means comprising a third electron discharge tube having an electrode coupled to the screen grid electrode in said first named tube, and a plurality of electrodes one of which is coupled to said alternating current output circuit, and means for controlling said peak values at signal frequency comprising a source of signalling potentials coupled with another electrode of said third tube.

12. In a signalling system, a carrier wave amplifying tube having a control grid, a cathode, and an output electrode, means for impressing carrier wave energy to be amplified on said control grid and cathode, an additional tube having input electrodes coupled to the output electrodes of said first tube and having an anode connected in an alternating current circuit, means connected with an electrode of said first tube and with said alternating current output circuit for lowering the gain of said first tube when energy in said output circuit exceeds predetermined peak values, said means comprising a third electron discharge tube having an electrode coupled to an electrode in said first tube and having a plurality of grid electrodes one of which is coupled to said alternating current output circuit, and means for controlling said peak values at signal frequency comprising a source of signalling potentials coupled with said other grid electrode of said third tube.

13. In a signalling system, a carrier wave amplifying tube having a screen grid, a cathode, a control grid, and an output electrode, means for impressing carrier waves to be amplified on said control grid and cathode, an additional tube having input electrodes coupled to the output electrodes of said first tube and having an anode connected in an alternating current output circuit, means connected with the screen grid electrode of said first tube and with said alternating current output circuit for lowering the gain of said first tube when energy in said output circuit exceeds predetermined peak values, said means comprising a third electron discharge tube having an output electrode coupled to the screen grid electrode in said first tube and having a screen grid electrode coupled to said alternating current output circuit, said third tube also having a control grid, and means for controlling said peak values at signal frequency comprising a source of signalling potentials coupled with said control grid of said third tube.

14. In a signalling system, a carrier wave amplifying tube having a screen grid, a cathode, a control grid, and an output electrode, means for impressing carrier waves to be amplified on said control grid and cathode, an additional tube having input electrodes coupled to the output electrodes of said first tube and having an anode connected in an alterating current output circuit, means connected with the screen grid electrode of said first tube and with said alternating current output circuit for lowering the gain of said first tube when energy in said output circuit exceeds predetermined peak values, said means comprising a third electron discharge device having an output electrode coupled to the screen grid electrode in said first tube and a control grid electrode coupled to said alternating current output circuit, said third tube also having an additional grid electrode, and means for controlling said peak values at signal frequency comprising a source of signalling potentials coupled with said additional grid electrode of said third tube.

JAMES L. FINCH.